United States Patent [19]

Moroi

[11] Patent Number: 5,210,823
[45] Date of Patent: May 11, 1993

[54] PRINTING CONTROL APPARATUS IN PAGE PRINTER

[75] Inventor: Shohei Moroi, Yokohama, Japan
[73] Assignee: Ricoh Company, Ltd., Tokyo, Japan
[21] Appl. No.: 933,663
[22] Filed: Aug. 24, 1992

[30] Foreign Application Priority Data

Aug. 26, 1991 [JP] Japan .................................. 3-213364

[51] Int. Cl.$^5$ ............................................ G06K 15/00
[52] U.S. Cl. ...................................... 395/116; 395/113
[58] Field of Search ............... 395/101, 114, 113, 116, 395/164; 355/205, 308; 358/404, 444, 437; 400/50

[56] References Cited

U.S. PATENT DOCUMENTS 4,979,131  12/1990  Suzuki .................................. 395/116
5,093,904  3/1992  Sasaki et al. ......................... 395/116

Primary Examiner—Arthur G. Evans
Attorney, Agent, or Firm—Mason, Fenwick & Lawrence

[57] ABSTRACT

In a printing control apparatus in a page printer for making prints based on print data supplied from an external unit page by page, when the page printer is in an idling state, the print data is directly converted into dot image information. When the page printer is not in the idling state, the print data is converted into descriptors while the prior page print is being formed, and the descriptors are converted into dot image information. A print is made based on the dot image information. The printing control apparatus further includes a first jam recovery block for recovering a print corresponding to a jammed paper in the page printer by using descriptors in a case where the descriptors have been stored in a page descriptor area of a memory, and a second jam recovery block for recovering a print corresponding to a jammed paper in the page printer by using dot image information which has been stored in a bit map area of the memory.

5 Claims, 11 Drawing Sheets

| (W) | | (W) |
|---|---|---|
| FUNC | FLAG | LINK |
| X-COORDINATE | | Y-COORDINATE |
| FONT RASTER IMAGE ADDRESS | | |
| UNUSED | | H |
| W | | |

| (W) | | (W) |
|---|---|---|
| FUNC | FLAG | LINK |
| X-COORDINATE | | Y-COORDINATE |
| OFF-SET OF IMAGE SAVE AREA | | |
| UNUSED | | H |
| W | | |

PRINTING CONTROL APPARATUS IN PAGE PRINTER

BACKGROUND OF THE INVENTION (1) Field of the Invention

The present invention generally relates to a printing control apparatus in a page printer, and more particularly to a printing control apparatus by which a page printer can efficiently make prints.

(2) Description of Related Art

A page printer makes prints page by page. The page printer has a memory into which dot image information for one page is mapped, and an image having an accurate dot layout can be printed by the page printer. Thus, in the page printer, high quality prints can be made at a high speed. For a laser beam printer, an LED printer and a liquid crystal printer, each of which is a page printer which can be used personally, prices are particularly low.

In the page printer, the memory is provided with a plurality of bit map areas into each of which dot image information for one page is mapped to improve a printing speed. In this case, while dot image information stored in a bit map area is being printed out, dot image information of the next page is being mapped into the next bit map area by utilizing an otherwise idle time of a CPU.

In the above case where the memory is provided with a plurality of bit map areas each of which has a capacity of one page, it is necessary for the memory to have a large capacity. To decrease a capacity required for the bit map area in the memory, the following page printer has been proposed. In this conventional page printer, the memory is divided into a system area 1, a page descriptor area 2, a working area 3 and a bit map area 4, as shown in FIG. 1. Information used for controlling the printer is stored in the system area 1. The working area 3 is used for processing various information such as print data supplied from a host computer. The bit map area 4 has a capacity of one page or between one page and two pages. That is, the capacity of the bit map area is less than that of two pages. Print data supplied from a host computer is converted into descriptors each having an intermediate format so that dot image information corresponding to the print data can be easily mapped into the bit map area 4 based on the descriptors. That is, a time required for converting the descriptors into the dot image information is less than a time required for directly converting the print data supplied from the host computer into the dot image information. The descriptors are stored in the page descriptor area 2 in the memory. FIG. 2A indicates a bit map area 4 of one page. In a case where A4 sized image is printed at a rate of 240 dpi (dot per inch), the dot image information having 1872(width)×2720(length) dots is mapped into the bit map area 4 of the memory. In this case, a bit map area 4 having a capacity of about 640K bytes is needed. In cases of B4 image size, the bit map area having a capacity of about 950K bytes is needed. In a case of A3 image size, the bit map area 4 having a capacity of about 1.2M bytes is needed. FIG. 2B indicates a bit map area 4 having a capacity between one page and two pages. In this case, the bit map area 4 is divided into a first area 4-1 of one page and a second area 4-2 of one page which are overlapped with each other so that an overlap area (O) is formed. In a case where the bit map has a capacity between one page and two pages, as shown in FIG. 2B, a printing control is carried out as follows.

In step 1, dot image information corresponding to one page printing data supplied from the host computer is mapped into the first area 4-1 of the bit map area 4 starting from an origin S1. In step 2, after the dot image information is completely mapped into the first area 4-1, all the dot image information in the first area 4-1 is shifted to the second area 4-2 of the bit map area 4 starting from an origin S2. In step 3, the dot image information is successively read out from the second area 4-2 of the bit map area 4 starting from the origin S2, and a print driving circuit is driven in accordance with the dot image information successively read out from the second area 4-2 of the bit map area 4 so that a print corresponding to the dot image information is formed on a recording sheet. While the print is being formed on the recording sheet in step 3, it is determined whether or not image information data in the overlap area (O) is finished being printed. In step 4, when it is determined that dot image information of the last line in the overlap area (O) is completely printed, since the first area 4-1 of the bit map area 4 is in an empty state, dot image information corresponding to the next page print data is mapped into the first area 4-1 starting from the origin S1. Then the above steps 1 through 4 are repeated a predetermined number of times corresponding to requested pages.

While the dot image information in the second area 4-2 is successively read out and printed on the recording sheet, in step 3, the next page print data is converted into descriptors and the descriptors are stored in the page descriptor area 2 in the memory. Then, in step 4, the dot image information is mapped into the first area 4-1 based on the descriptors corresponding to the next page's print data. Thus, the dot image information is easily and efficiently mapped into the first area 4-1. That is, the prints for a plurality pages can be formed at a high speed.

However, the above conventional process for forming prints in the page printer has the following disadvantages.

Immediately after an electric power supply of the page printer is turned on, and immediately after the prior job for forming prints is finished, the bit map area 4 of the memory is empty. In this state (herein after referred to as an idling state), even if the bit map area 4 is empty, the descriptors corresponding to the first page print data must be prepared and stored in the page descriptor area 2. After that, the dot image information is prepared based on the descriptors and mapped into the bit map area 4.

In this case, since immediate data such as the descriptors must be prepared before dot image information is mapped into the bit map area 4 although the bit map area 4 is empty, the mapping to form the first page is delayed. Particularly, in a case where the first page print data includes a large amount of images such as diagrams and graphs, an amount of data of the descriptors reaches a value in a range between few tens K bytes and few hundreds K bytes. That is, a large load for making the descriptors is applied to a processor in the page printer. As a result, it is further delayed to form the first page print. In addition, in a case where the first page print data includes many complex images, the capacity of the page descriptor area 2 of the memory becomes insufficient. In this case, since a process for converting the first page data into the descriptors is interrupted and the dot image information is formed directly based on the print data, a time for obtaining the descriptors is wasted.

SUMMARY OF THE INVENTION

Accordingly, a general object of the present invention is to provide a novel and useful printing control apparatus in a page printer in which the disadvantages of the aforementioned prior art are eliminated.

A more specific object of the present invention is to provide a printing control apparatus in a page printer in which, immediately after the power supply of the page printer is turned on and immediately after the prior job for forming prints is finished, a time for obtaining the first page print can be decreased.

The above objects of the present invention are achieved by a printing control apparatus in a page printer for making prints based on print data supplied from an external unit page by page, the apparatus comprising: first determination means for determining whether or not the page printer is in an idling state which is a state where the page printer is waiting for the first page print data in one print job to be supplied from the external unit; first control means, coupled to the first determination means, for controlling the page printer so that a print corresponding to the print data supplied from the external unit is made when the first determination means determines that the page printer is in the idling state, the first control means comprising conversion means for directly converting the print data supplied from the external unit into dot image information, so that the print is made based on the dot image information; and second control means, coupled to the first determination means, for controlling the page printer so that a print corresponding to the print data supplied from the external unit is made when the first determination means determines that the page printer is in the idling state, the second control means comprising first conversion means for converting the print data supplied from the external unit into descriptors while a prior print is being made by the page printer, the descriptors being intermediate information used for converting the print data to dot image information, and second conversion means for converting the descriptors obtained by the first conversion means into dot image information, so that the print is made based on the dot image information.

According to the present invention, when the page printer is in the idling state, the print data supplied from the external unit (e.g. the host computer) is directly converted into the dot image information, and when the page printer is not in the idling state, the print data is converted into the descriptors while the prior page print is being formed. Thus, prints can be efficiently made in the page printer.

Another object of the present invention is to provide a printing control apparatus in a page printer in which prints formed on jammed papers in the page printer can be efficiently recovered.

The above objects of the present invention are achieved by a printing control apparatus further comprising first jam recovery means for recovering a print corresponding to a jammed paper in the page printer by using descriptors in a case where the descriptors have been stored in the page descriptor area of the memory; and second jam recovery means for recovering a print corresponding to a jammed paper in the page printer by using dot image information which has been stored in the bit map area of the memory.

The above objects of the present invention are also achieved by a print control apparatus further comprising data save means for saving the print data in a saving area provided with the memory when the first control means is activated; and third jam recovery means for recovering a printout corresponding to a jammed paper in the page printer by using the print data saved in the saving area in the memory.

According to the present invention, various data such as the descriptors and the print data can be used for recovering a printout corresponding to a jammed paper. Thus, the printout corresponding to the jammed paper can be efficiently recovered.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention.

Figure 1:
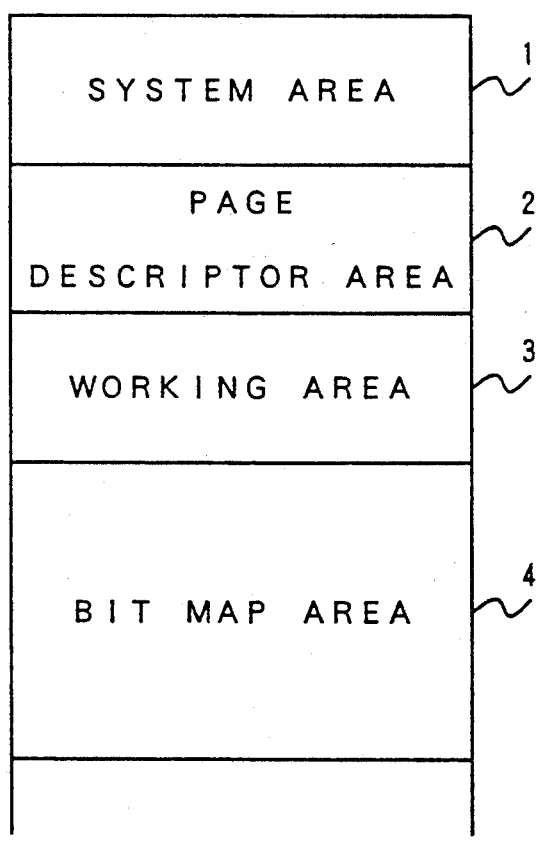
FIG. 1 is a diagram illustrating areas formed in a memory provided in a page printer.
Figure 2:
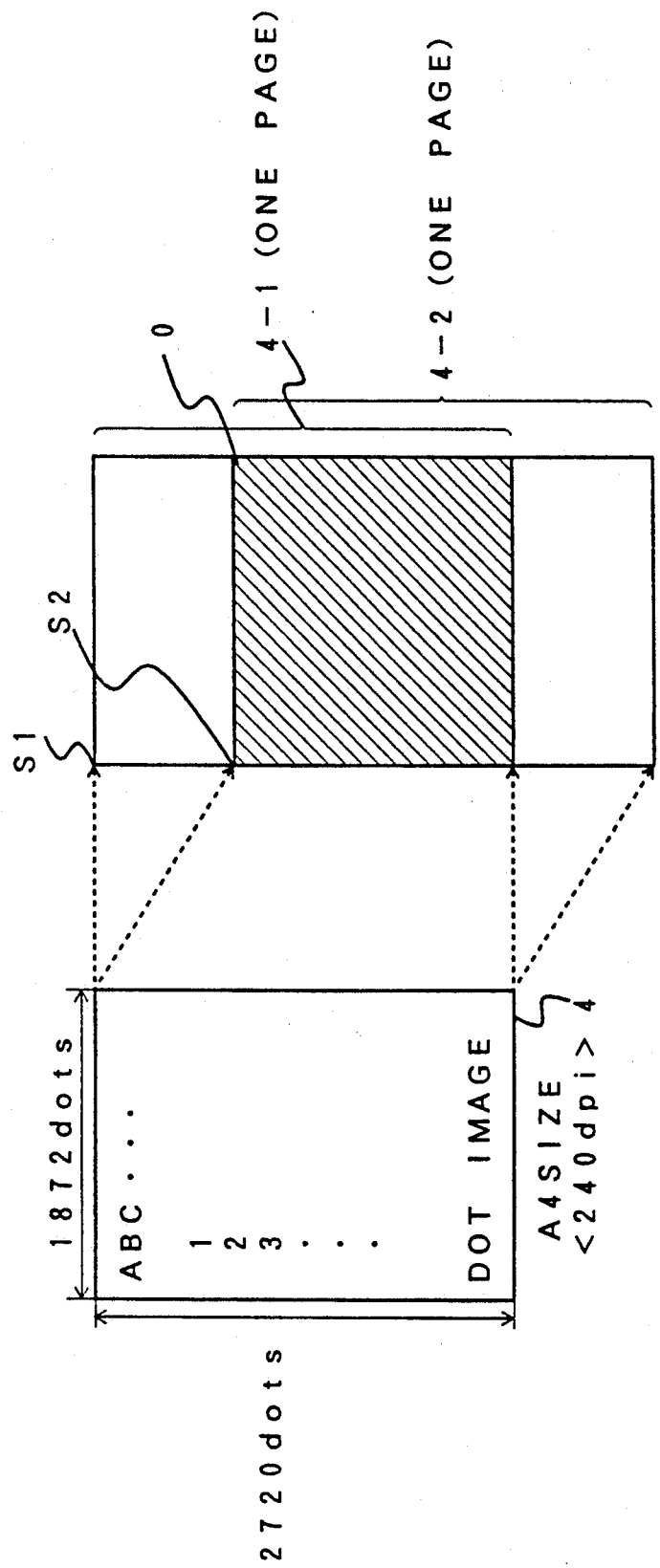
FIG. 2A and 2B are diagrams illustrating examples of a bit map area formed in the memory.
Figure 3:
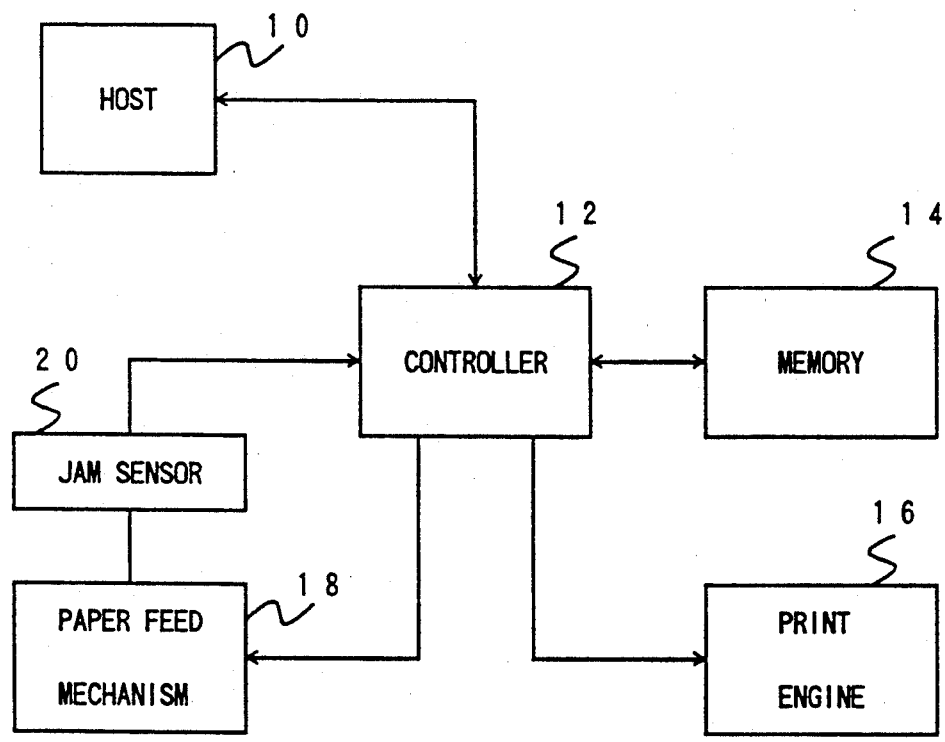
FIG. 3 is a block diagram illustrating a page printer.
Figures 4A, 4B:
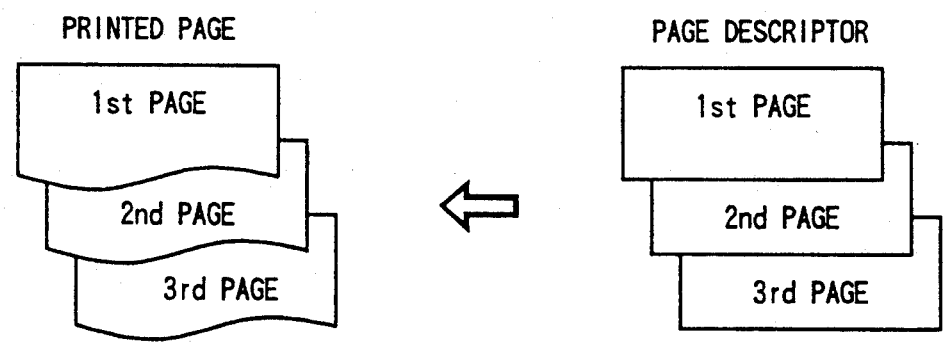
FIG. 4A is a diagram illustrating relationships between page descriptors and printouts
FIG. 4B is a diagram illustrating a descriptor representing a font.
Figures 4C, 4D:
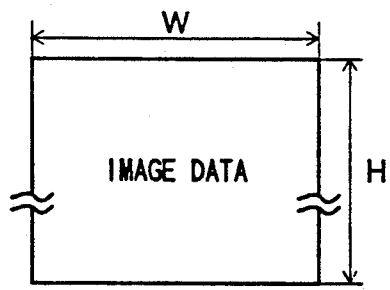
FIG. 4C is a diagram illustrating a descriptor representing an image.
FIG. 4D is a diagram illustrating a size of an image.

Referring to FIG. 3, which shows a basic structure of a page printer, a host computer 10 is coupled to a controller 12 of a page printer so that print data edited in the host computer 10 is supplied to the controller 12. A memory 14 utilized by the controller 12, a print engine 16 for driving a mechanism for forming prints, a paper feed mechanism 18 for feeding recording papers on which prints should be formed, and a jam sensor 20 for detecting a paper jam occurring in the paper feed mechanism 18 are connected to the controller 12. The memory 14 has the system area 1, the page descriptor area 2, the wording area 3 and the bit map area 4, as shown in FIG. 1. The bit map area 4 has a capacity for one page or between one page and two pages, as shown in FIG. 2A or 2B. Each of the other areas 1, 2 and 3 has a predetermined capacity. A page descriptor formed of descriptors for each page print data is written in the page descriptor area 2. Thus, page descriptors stored in the page descriptor area 2 for the first page, the second page, the third page, . . . respectively correspond to printed pages of the first page, the second page, the third page . . . , as shown in FIG. 4A. Each of the descriptors representing a font of a character has a format shown in FIG. 4B. That is, a descriptor has information indicated by FUNC, FLAG and LINK. FUNC is information representing a function (a subroutine offset) used for laying out dot image information corresponding to a character identified by the descriptor in the bit map area 4. FLAG is information representing a mode of a process for writing the dot image information in the bit map area 4. LINK is link information (an offset) of the descriptor. The descriptor for a character further has information representing a font size (W and H), coordinate data (X and Y) of a position at which the font should be mapped into the bit map area 4, and a font raster image address. The font size is defined by a width (W) and a height (H), as shown in FIG. 4D. Each of the descriptors representing an image has a format shown in FIG. 4C. That is, a descriptor has information indicated by FUNC, FLAG and LINK, coordinate data (X and Y) of a position at which the image should be mapped into the bit map area 4 in the same manner as that for a font of a character. The descriptor for an image further has information regarding an offset of an image save area.

Descriptors in the same page descriptor are linked by the link information (LINK). Thus, all the descriptors in the same page descriptor are selected with reference to the link information (LINK), and dot image information corresponding to the selected descriptors is mapped into the bit map area 4. In an idle time of a processor (CPU) of the controller 12, page descriptors are written in the page descriptor area 2 of the memory 14 until the page descriptor area 2 is filled with the descriptors.

Print data supplied from the host computer 10 to the page printer is processed in accordance with the flow charts shown in FIGS. 5A through 7. The process shown in FIGS. 5A through 7 is carried out by the controller 12.

Figure 5A:
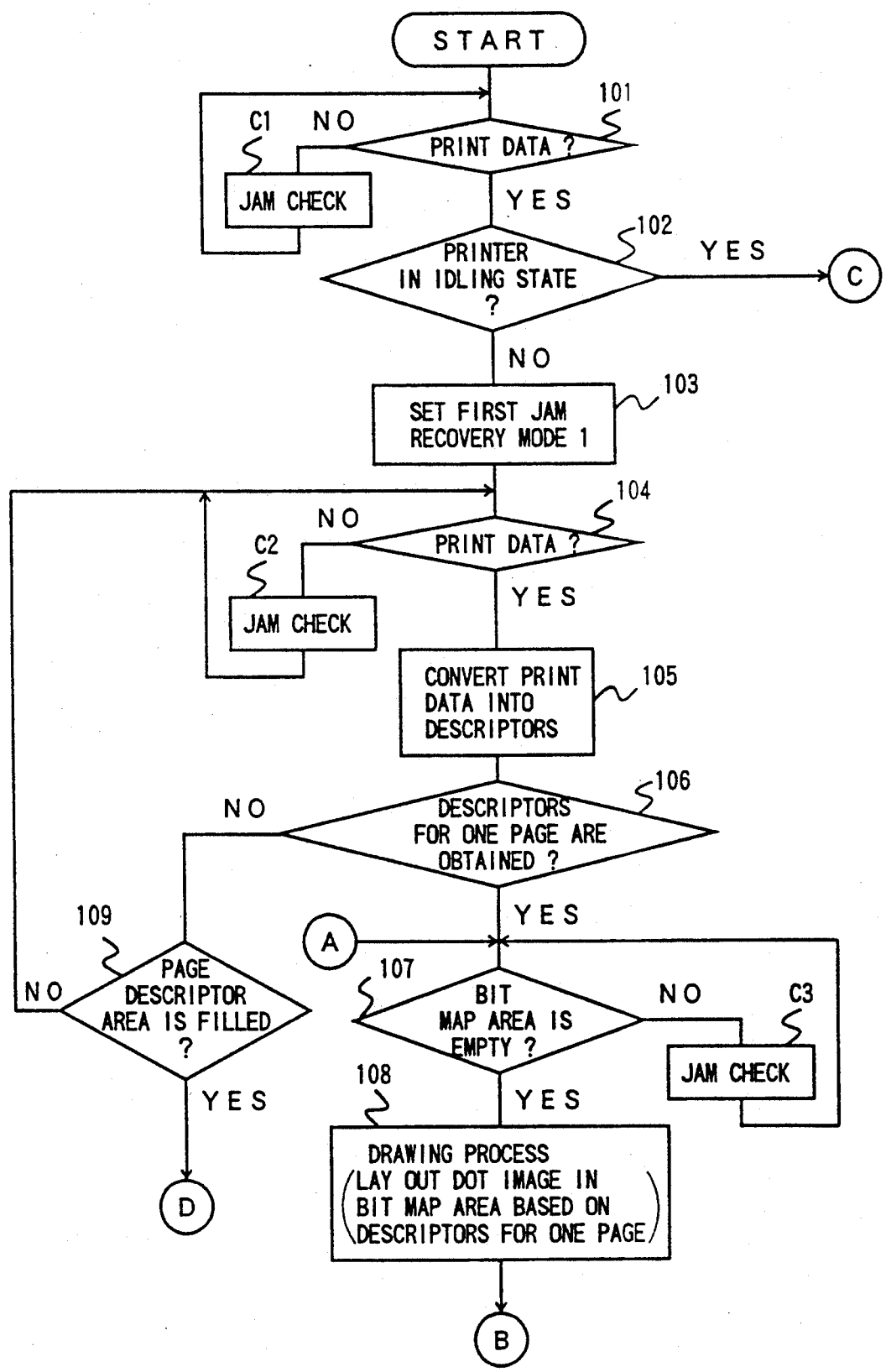
FIGS. 5A, 5B, 5C and 5D are flow charts illustrating a process for forming a print.

Referring to FIG. 5A, step 101 determines whether or not print data supplied from the host computer 10 is in a receiving buffer in the controller 12. When the print data is stored in the receiving buffer, step 102 determines whether or not the page printer is in an idling state. The idling state is defined as a state in which the page printer is waiting for a print start instruction immediately after the power supply of the page printer is turned on or immediately after the prior job for forming prints is finished. When step 102 determines that the page printer is in the idling state, the process proceeds to step 301 shown in FIG. 5C.

At this time, information regarding conditions, such as a printing pitch and various printing modes, required for forming a printout for one page has already been transmitted from the host computer 10 along with the print data and stored in the receiving buffer. In step 301, the above information regarding the conditions required for forming a print for one page is saved in the working area 3 of the memory 14. Then step 302 sets a third jam recovery mode (3) in the controller 12. The third recovery made (3) will be described later. After this, step 303 determines whether or not the print data is in the receiving buffer. In a case where the print data is in the receiving buffer, a process for saving the print data for a paper jam occurring in the paper feed mechanism 18 is carried out in accordance with the following steps. Step 304 determines whether or not a saving area provided in the working area 3 of the memory 14 is filled with print data. When a result obtained in the step 304 is NO, step 305 determines whether or not a recovery mode flag is set. In a case where the recovery mode flag is not set, step 306 determines whether or not a second jam recovery mode (2) is set. When step 306 determines that the second jam recovery mode is not set, step 307 saves the print data stored in the receiving buffer in the saving area.

After the print data is saved in the saving area as described above, the print data stored in the receiving buffer is processed and converted into dot image information, in step 308. Then, step 309 carries out a drawing process for mapping the dot image information in the bit map area 4. Then, step 310 determines whether o not dot image information for one page is mapped into the bit map area 4, and the above steps 303–310 are repeated until the dot image information for one page is completely mapped into the bit map area 4.

In the above process, when step 304 determines that the saving area is filled with the print data, step 311 releases the saving area so that saving of the print data is interrupted, and step 312 sets a second jam recovery mode (2). Then the process proceeds to step 308. In this case, as the print data includes a large amount of image information, the saving area cannot store all the print data. Thus, the print data is converted into the dot image information, and the dot image information is stored in the bit map area 4 of the memory 14. Then the dot image information is being saved in the bit map area 4 until a printout corresponding to the dot image information is completely formed without a paper jam.

In addition, when the result obtained by either step 305 or step 306 is YES, the process proceeds directly to step 308.

Figure 5B:
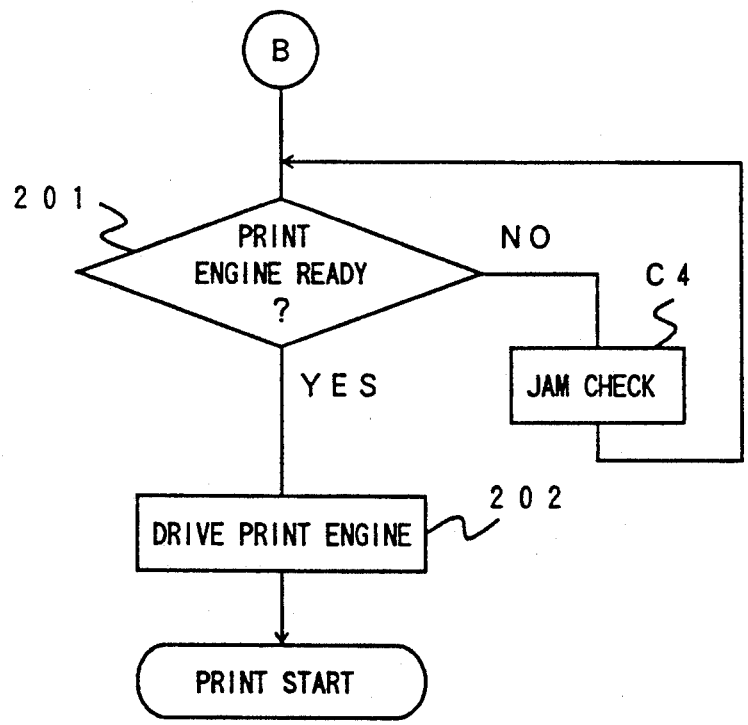
Figure 5C:
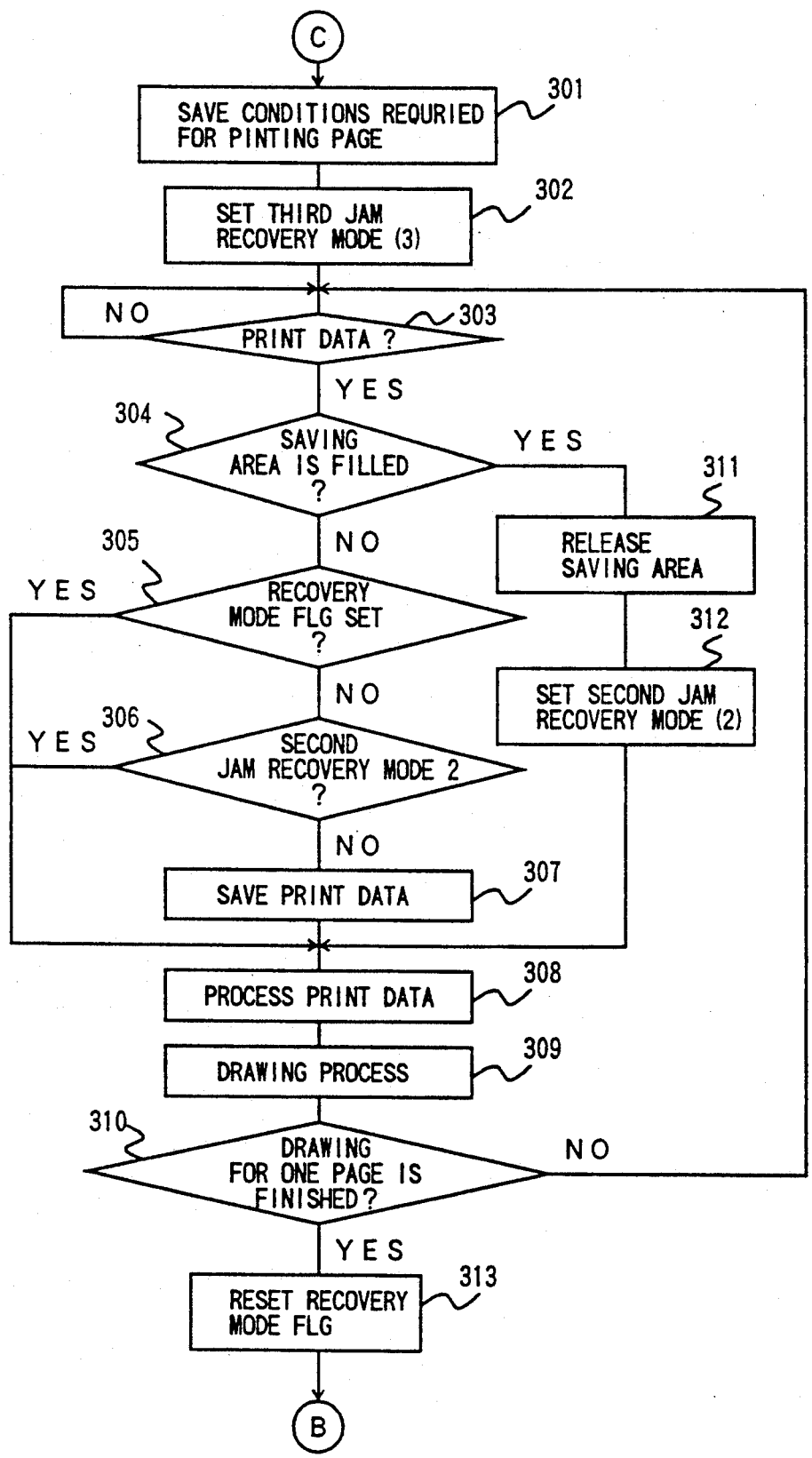

When the dot image information for one page is completely mapped into the bit map area 4, the process proceeds to step 201 shown in FIG. 5B.

Step 201 determines whether or not the print engine 16 is in a ready state. In a case where the print engine 16 is in the ready state, the print engine 16 is driven in step 202, so that a print starts to be formed. The print is then formed on a sheet of recording paper fed by the paper feed mechanism 18 by using the dot image information mapped into the bit map area 4 of the memory 14.

While the print of the first page is being formed by the page printer, the process is carried out from the step 101 shown in FIG. 5A again. In this case, after step 101 determines that the print data for the next page supplied from the host computer 10 is stored in the receiving buffer, step 102 determines that the page printer is not in the idling state. Then, step 103 sets a first jam recovery mode (1). After this, step 104 determines whether or not the print data is stored in the receiving buffer. When step 104 determines that the print data is stored in the receiving area, step 105 converts the print data stored in the receiving area into descriptors as shown in FIGS. 4b and 4C. The descriptors obtained in step 106 are stored in the page descriptor area 2 of the memory 14. Then step 106 determines whether or not the descriptors corresponding to the print data for one page is stored in the page descriptor area 2, and the above steps 104, 105 and 106 are successively repeated until the descriptors corresponding to the print data for one page are completely stored in the page descriptor area 2. While the above steps 104, 105 and 106 are successively repeated, step 109 determines whether or not the page descriptors is filled with descriptors. When the descriptors corresponding to the print data for one page are completely stored in the page descriptor area 2 (the result of step 106 is YES), step 107 determines whether or not the bit map area 4 is empty. Here, when the print of the first page (the prior page) is finished, the bit map area 4 becomes empty. At this time, step 107 determines that the bit map area 4 is empty. Thus, the process proceeds to step 108, and step 108 carries out the drawing process for mapping dot image information in the bit map area 4 based on the descriptors stored in the page descriptor area 2. After this, the process is carried out in accordance with a flow chart shown in FIG. 5B, so that the next page is printed.

Figure 5D:
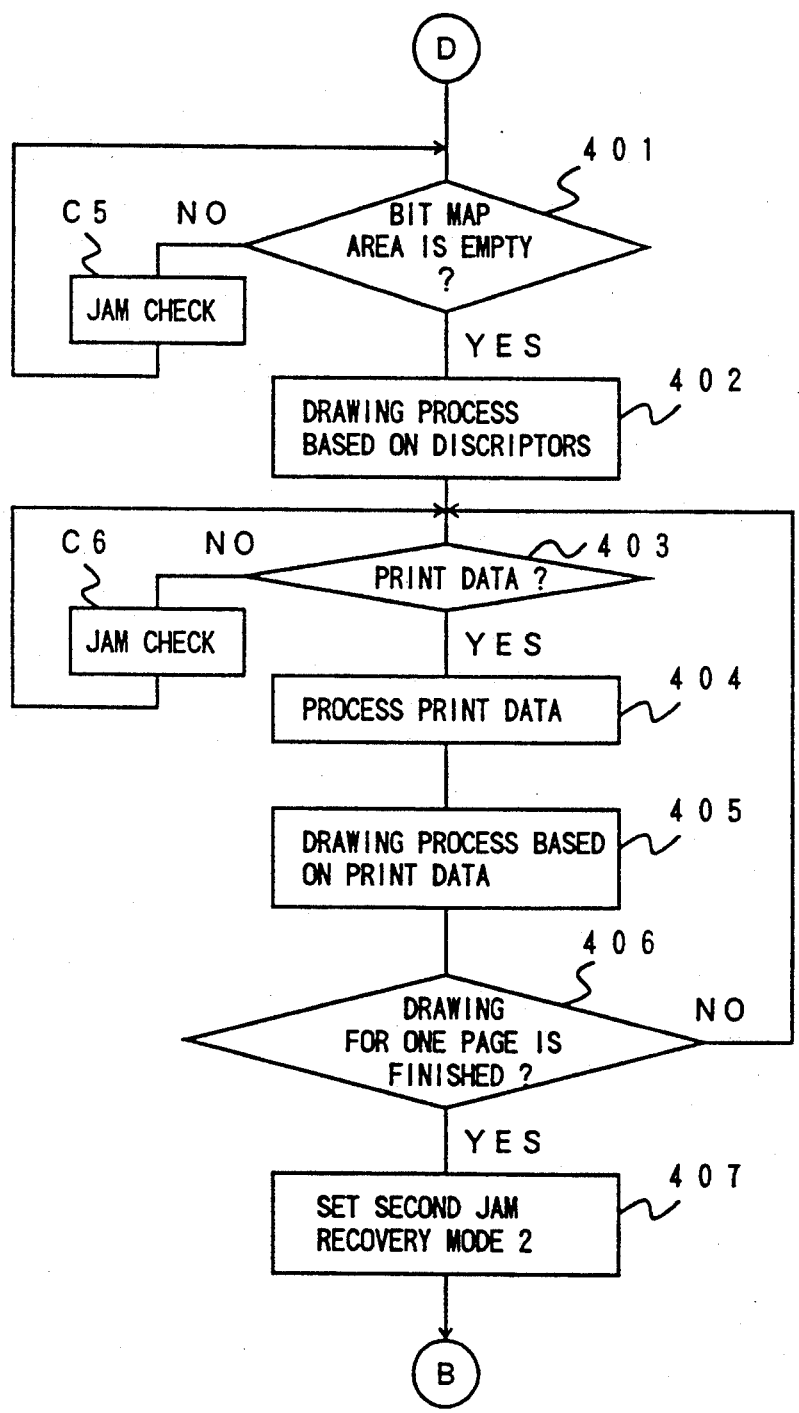

While the print data is being converted into the descriptors (steps 104, 105 and 106), the page descriptor area 2 is filled with the descriptors, the process proceeds from step 109 to step 401 shown in FIG. 5D.

Referring to FIG. 5D, step 401 determines whether or not the bit map area 4 is empty. When the printing of the prior page is finished, the bit map area 4 becomes empty. At this time, the process proceeds to step 402. Step 402 carries out the drawing process for mapping dot image information in the bit map area 4 based on the descriptors into which the print data has been already converted. After this, step 403 determines whether or not the print data which is not converted into the descriptors is stored in the receiving buffer. When the result obtained in step 403 is YES, the print data which is not converted into the descriptors is processed and converted into the dot image information, in step 404. Then step 405 carries out the drawing process for mapping the dot image information in the bit map area 4. Step 406 determines whether of not the dot image information for one page is completely mapped into the bit map area 4. The above steps 403, 404, 405 and 406 are successively repeated until the dot image information for one page is completely mapped into the bit map area 4. When step 406 determines that the dot image information for one page is completely mapped into the bit map area 4, step 407 sets the second jam recovery mode (2). After this, the process is carried out in accordance with the flow chart shown in FIG. 5B, so that the print of the next page is formed.

Figure 6:
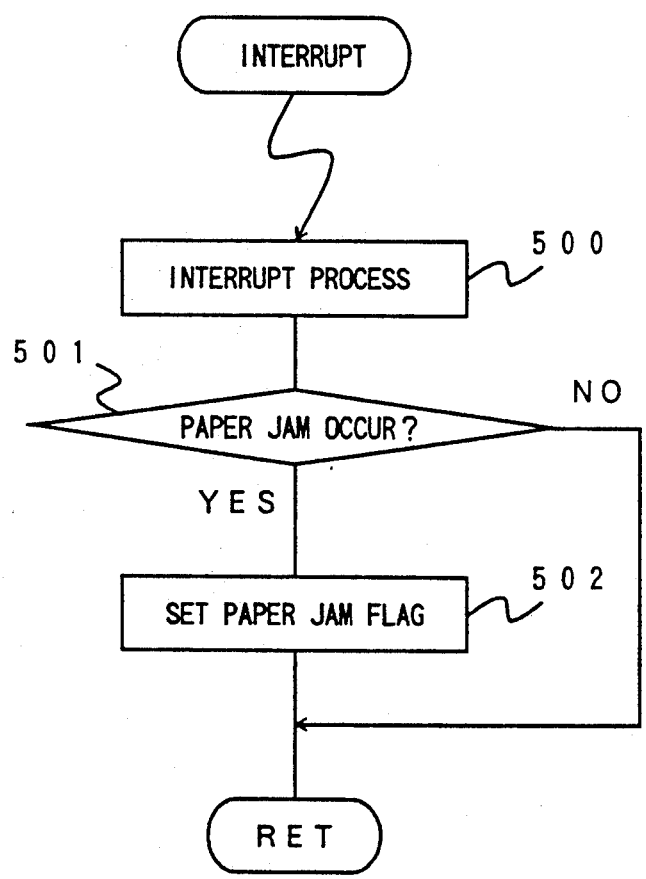
FIG. 6 is a flow chart illustrating an interrupt process for detecting a paper jam occurring in the page printer.

While the process is being carried out in accordance with the flow charts shown in FIGS. 5A-5D, controller 12 carries out an interrupt process for detecting a paper jam based on a detecting signal supplied from the jam sensor 20 as shown in FIG. 6. Referring to FIG. 6, after the interrupt process starts in step 500, when step 501 determines that a paper jam occurs, step 502 sets a paper jam flag.

In the above process shown in FIGS. 5A-5D, a plurality of checking steps for checking whether or not a paper jam occurs are carried out. A first checking step C1, a second checking step C2 and a third checking step C3 are respectively carried out with steps 101, 104 and 107, as shown in FIG. 5A. A fourth checking step C4 is carried out with step 201 as shown in FIG. 5B. A fifth checking step C5 and a sixth checking step C6 are respectively carried out with steps 401 and 403, as shown in FIG. 5D. Each of the checking steps C1-C6 is carried out in accordance with a flow chart shown in FIG. 7.

Figure 7:
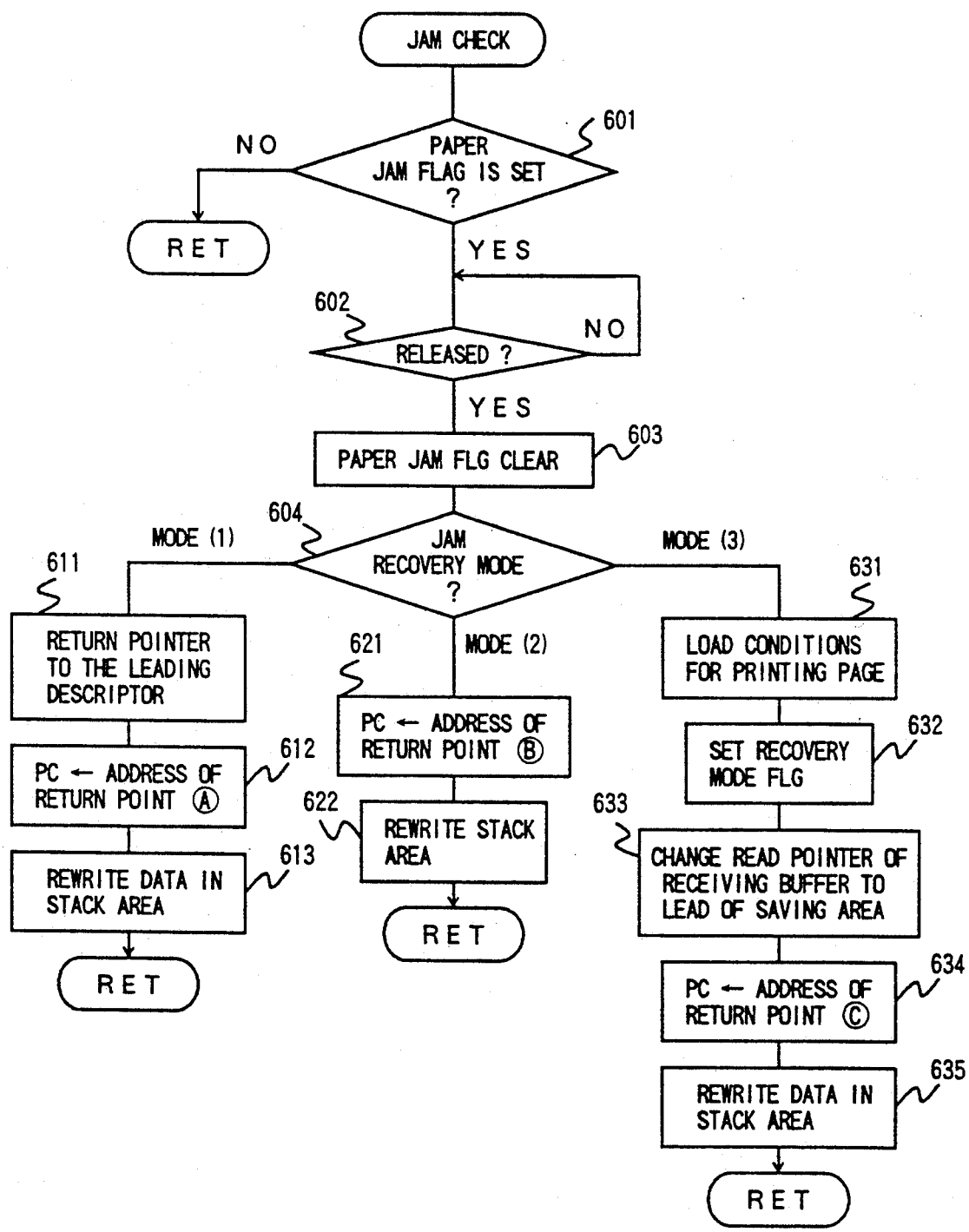
FIG. 7 is a flow chart illustrating a process for recovering a printout when a paper jam occurs.

Referring to FIG. 7, step 601 determines whether or not the paper jam flag is set. When the result obtained in step 601 is NO, the process returns to a predetermined step shown in FIGS. 5A-5D. When a paper jam has been detected by the interrupt process shown in FIG. 6, the result obtained in step 601 is YES. In this case, after an instruction for releasing a state where the paper jam flag is set is recognized by the controller 12 (in step 602), step 603 clears the paper jam flag. After that, step 604 determines what type of jam recovery mode is set.

When step 604 determines that the first jam recovery mode (1) is set, the process is carried out in accordance with steps 611, 612 and 613. Step 611 returns a pointer to a lead address of the descriptors corresponding to a jammed paper which descriptors have been stored in the page descriptor area 2 of the memory 14. Step 612 resets a program counter to a value corresponding to an address of a returning point (A) shown in FIG. 5A. Then step 613 rewrites data in a stack area provided in the system area 1 so that the process can start from the returning point (A). After the steps 611, 612 and 613 are completed, the process starts from the returning point (A). That is, the dot image information is prepared based on the descriptors corresponding to the jammed paper, and mapped into the bit map area 4. The process is carried out in accordance with the flow chart shown in FIG. 5B, so that a print is then formed on a new sheet of recording paper fed by the paper feed mechanism 18 by using the dot image information mapped into the bit map area 4 of the memory 14. That is, the print which was formed on the jammed paper is recovered.

When step 604 determines that the second jam recovery mode (2) is set, the process is carried out in accordance with steps 621 and 622. Step 612 resets the program counter to a value corresponding to an address of a returning point (B) shown in FIG. 5B. Then step 622 rewrites data in the stack area so that the process can start from the returning point (B). After the steps 621 and 622 are completed, the process starts from the returning point (B). That is, the process is carried out in accordance with the flow chart shown in FIG. 5B. In this case, dot image information corresponding to the jammed paper has been already mapped in the bit map area 4 of the memory 14. Thus, a printout is formed on a new recording paper fed by the paper feed mechanism 18 by using the dot image information mapped into the bit map area 4 of the memory 14. That is, the printout which was formed on the jammed paper is recovered.

When step 604 determines that the third jam recovery mode (3) is set, the process is carried out in accordance with steps 631, 632, 633, 634 and 635. Step 631 loads information regarding the conditions required for a print corresponding to the jammed paper in a predetermined area in the working area 3 of the memory 14. Step 632 sets the recovery mode flag, and then step 633 changes a read pointer of the receiving buffer to the lead address of the saving area provided in the working area 3. Step 364 resets the program counter to a value corresponding to an address of a returning point (C) shown in FIG. 5C. Then step 635 rewrites data in the stack area so that the process can start from the returning point (C). After the steps 631, 632, 633, 634 and 635 are completed, the process starts from the returning point (C). That is, the process is carried out in accordance with the flow chart shown in FIG. 5C. In this case, the print data corresponding to the jammed paper has been stored in the saving area provided in the working area 3 of the memory 14. Thus, after it is determined that the recovery mode flag is set in step 305, the print data stored in the saving area is converted into the dot image information. The dot image information is mapped into the bit map area 4 of the memory 14 (steps 308, 309 and 310) As a result, a printout is formed on a new recording paper fed by the paper feed mechanism 18 by using the dot image information mapped into the bit map area 4 of the memory 14. That is, the print which was formed on the jammed paper is recovered.

According to the above embodiment, in a case where the page printer is in the idling state, descriptors corresponding to print data are not made, and the print data is directly converted into dot image information. In a case where the page printer is not in the idling state, the print data is converted into descriptors while a printout for the prior page is being formed. After this, dot image information is mapped in the bit map area 4 based on the descriptors. Thus, printouts are successively formed efficiently.

In addition, in a case where the descriptors has been stored in the page descriptor area 2, a print corresponding to a jammed paper is recovered by using the descriptors stored in the page descriptor area 2. In a case where the print data has been saved in the saving area, a printout corresponding to a jammed paper is recovered by using the print data stored in the saving area. Further, in a case where print data includes a large amount of image information, the print data for one page and the descriptors for one page cannot be respectively stored in the saving area and the page descriptor area 2. In this case, the dot image information formed from the descriptors and the print data is saved in the bit map memory. Then a print corresponding to a jammed paper is recovered by using the dot image information stored in the bit map area 4. Thus, the jam recovery process can be efficiently carried out.

The present invention is not limited to the aforementioned embodiments, and variations and modifications may be made without departing from the scope of the claimed invention.

What is claimed is:

1. A printing control apparatus in a page printer for making prints based on print data supplied from an external unit page by page, said apparatus comprising:

first determination means for determining whether or not the page printer is in an idling state which is a state where the page printer is waiting for a first page print data in one print job to be supplied from the external unit;

first control means, coupled to said first determination means, for controlling the page printer so that a printout corresponding to the print data supplied from said external unit is made when said first determination means determines that the page printer is in the idling state, said first control means comprising conversion means for directly converting the print data supplied from said external unit into dot image information, so that the print is made based on the dot image information; and second control means, coupled to said first determination means, for controlling said page printer so that a printout corresponding to the print data supplied from said external unit is made when said first determination means determines that said page printer is in the idling state, said second control means comprising first conversion means for converting the print data supplied from said external unit into descriptors while a prior printout is being made by the page printer, said descriptors being intermediate information used for converting the print data to dot image information, and second conversion means for converting the descriptors obtained by said first conversion means into dot image information, so that the printout is made based on the dot image information.

2. An apparatus as claimed in claim 1, wherein said page printer has a memory provided with a page descriptor area for storing the descriptors and a bit map area for storing the dot image information, and wherein the descriptors into which the print data is converted by said first conversion means of said first control means is stored in the page descriptor area and the dot image information into which the print data and the descriptors are respectively converted by said conversion means of said first control means and said second conversion means of said second control means is stored in the bit map area.

3. An apparatus as claimed in claim 2, further comprising:

first jam recovery means for recovering a printout corresponding to a jammed paper in said page printer by using descriptors in a case where the descriptors have been stored in the page descriptor area of said memory; and second jam recovery means for recovering a printout corresponding to a jammed paper in said page printer by using dot image information which has been stored in the bit map area of said memory.

4. An apparatus as claimed in claim 3, further comprising:

data save means for saving the print data in a saving area provided with said memory when said first control means is activated; and third jam recovery means for recovering a print corresponding to a jammed paper in said page printer by using the print data saved in the saving area in said memory.

5. An apparatus as claimed in claim 4, further comprising:

second determination means whether or not an amount of the print data is greater than a capacity of the saving area of said memory;

third conversion means, in a case where said second determination means determines the amount of the print data is greater than the capacity of the saving area, for converting the print data into dot image information and for storing the dot image information in the bit map area;

recovery control means, in a case where said second determination means determines that the amount of the print data is greater than the capacity of the saving area, for activating said second jam recovery means, and in a case where said second determination means determines that the the amount of the print data is not greater than the capacity of the saving area, for activating said third jam recovery means.

* * * * *